United States Patent [19]

Tomantschger et al.

[11] Patent Number: 5,043,234
[45] Date of Patent: Aug. 27, 1991

[54] RECOMBINATION OF EVOLVED OXYGEN IN GALVANIC CELLS USING TRANSFER ANODE MATERIAL

[75] Inventors: Klaus Tomantschger, Mississauga, Canada; Karl Kordesch, Lakewood, Ohio; Erkut Oran, Willowdale, Canada

[73] Assignee: Battery Technologies Inc., Mississauga, Canada

[21] Appl. No.: 478,638

[22] Filed: Feb. 12, 1990

Related U.S. Application Data

[63] Continuation-in-part of Ser. No. 405,309, Sep. 11, 1989, Pat. No. 4,900,642, which is a continuation of Ser. No. 234,922, Sep. 22, 1988, abandoned.

[51] Int. Cl.$^5$ .............................................. H01M 10/52
[52] U.S. Cl. ........................................ 429/59; 429/229
[58] Field of Search ...................... 429/57, 59, 60, 229

[56] References Cited

U.S. PATENT DOCUMENTS 3,350,225 10/1967 Seiger .
3,438,812 8/1965 Cherney et al. .
3,536,537 12/1964 Solomon .
4,091,178 5/1978 Kordesch .............................. 429/60

4,246,326 1/1981 Sprengel et al. .

FOREIGN PATENT DOCUMENTS 290668 12/1986 Japan .

Primary Examiner—Donald L. Walton
Attorney, Agent, or Firm—Donald E. Hewson

[57] ABSTRACT

In rechargeable, electrochemical cells, oxygen may evolve on charge, overcharge or any reversal of polarity. The invention concerns an auxiliary, electrochemical, transfer electrode to catalyze the recombination of such oxygen with the anode mass. The auxiliary electrode may comprise a porous carbon bonded with PTFE, or it may comprise a zinc gel having graphite particles and/or metal-plated zinc particles—where the metal that plates the zinc particles may be copper, or may be any of cobalt, cadmium, nickel, or silver. The auxiliary electrode for rectangular electrodes as used in flat plate or jelly roll cells may have the catalytically active material PTFE bonded to the current collector. The cell is generally one having a zinc anode, a metal oxide cathode (usually manganese dioxide), and an aqueous alkaline electrolyte (usually potassium hydroxide) contacting both anode and cathode.

23 Claims, 2 Drawing Sheets

RECOMBINATION OF EVOLVED OXYGEN IN GALVANIC CELLS USING TRANSFER ANODE MATERIAL

This application is a continuation in part of application Ser. No. 07/405,309 filed Sept. 11, 1989, now Pat. No. 4,900,642 issued Feb. 13, 1990; which is a continuing application from application Ser. No. 07/234,922 filed Aug. 22, 1988, now abandoned.

FIELD OF THE INVENTION

This invention relates to galvanic cells having means to recombine evolved oxygen with the negative electrode active mass. Recombination of oxygen avoids the loss of water and reduces the risk of pressure build up in the cell. It is of particular importance in relation to sealed cells such as rechargeable alkaline cells e.g., zinc/manganese dioxide cells with a potassium hydroxide electrolyte. The present invention may provide economic means of accelerating the consumption of oxygen by the anode, oxygen gas buildup is mitigated by oxygen reduction to OH or water, and oxidation of the respective amount of anode active material. In all cases, the catalytically active material maintains electronic and ionic contact with the respective active battery electrode.

BACKGROUND OF THE INVENTION

The prior art has concerned itself, for many years, with the problem of reducing or eliminating the loss of water in galvanic cells using aqueous electrolyte and avoiding build up of excessive gas pressure in sealed cells. Oxygen gas is evolved during overcharge or cell reversal.

Several galvanic couples are known with a capability of oxygen recombination cycles; however, the recombination rates are not always as fast as might be desired. PbO2-Pb and Ni-Cd, for example, show high rates of oxygen recombination, while batteries employing Zn anodes (Ni-Zn, MnO2-Zn, AgO-Zn, and HgO-Zn) exhibit low rates. Reference to the theory of this lead-acid battery oxygen recombination for instance is made in "Batteries, Vol 2, Lead-Acid Batteries and Electric Vehicles" pp. 69-61 by K Kordesch, and to the Ni-Cd couples in "Alkaline Storage Batteries", by A. Salkind. The reduction to practice, through, has not been easy and a variety of difficulties has been reported: such as sealing problems, negative "fade" (e.g. passivation of the negative cadmium electrode with time), gradual decrease in effectiveness of the negative active material reserve which is provided in some designs in order to minimize—if not entirely suppress—hydrogen evolution during charge and overcharge, the general problem of coping with the recombination of nonstoichiometrically evolving oxygen and hydrogen, etc.

Three approaches are often used in efforts to solve these problems. These approaches are:

1) Operation of the "oxygen cycle". Hydrogen evolution is suppressed and the evolved oxygen (during charge and overcharge) is recombined at the always partially discharged negative electrode [U.S. 3,258,360 (1966)].

2) Catalytic recombination of hydrogen and oxygen inside or outside the battery; in the latter case, provisions are made for the return of the product water to the electrolyte chamber [U.S. 3,630,778 (1971), U.S. 3,598,653 (1971), U.S. 3,622,398 (1971), U.S. 3,701,691 (1972)].

3) Use of an auxiliary (third) electrode as overcharge recombination reactors, as described in "Electrochem. Technol., 4, 383 (1966) by P. Ruetschi and J.B. Ockerman.

It has now been unexpectedly discovered that the addition of a disc of carbon bonded with polytetrafluoroethylene PTFE as an electrochemical, transfer electrode for the anode mass, has the effect to enhance oxygen recombination at the anode. Further, it has been found that the use of a transfer anode material such as a gel carrying catalytic material will also enhance oxygen recombination at the anode.

According to a first embodiment of the present invention, there is provided a rechargeable electrochemical cell having a metal oxide cathode, a zinc anode, and an aqueous alkaline electrolyte contacting the anode and the cathode, in which cell oxygen may evolve on charge, overcharge, or any reversal of cell polarity. The cell includes an auxiliary, electrochemical, transfer electrode for the anode. The auxiliary electrode is physically separated from the anode but is in electronic and ionic contact with it, and is at least partially wetted by the electrolyte. The auxiliary electrode comprises porous carbon bonded with polytetrafluoroethylene.

In a further embodiment of the present invention, there is provided a rechargeable electrochemical cell having a metal oxide cathode, a zinc anode, and an aqueous alkaline electrolyte contacting the anode and the cathode, and a transfer anode material which is in electronic and ionic contact with the anode. (which transfer anode material is porous and at least partially wetted by the electrolyte), is physically associated with the current collector. The transfer anode material generally comprises a zinc gel together with a catalytic material which promotes accelerated consumption of any oxygen gas present within the cell by the anode and/or by the transfer anode material.

The metal oxide of the cathode may be manganese dioxide, which may be mixed with graphite in an amount of from 5% to 20% by weight, or may be mixed with nickel oxide in an amount of from 10% to 20% by weight.

Alternatively the metal oxide may be nickel oxide, silver oxide or mercury oxide and may be mixed with graphite in an amount of from 5% to 20% by weight.

The present invention may provide economic and effective means of reabsorbing oxygen gas in galvanic cells.

Embodiments of the invention will now be described by way of illustration with reference to the drawings in conjunction with examples describing the invention, and its operating characteristics.

DESCRIPTION OF THE PREFERRED EMBODIMENTS

Figure 1:
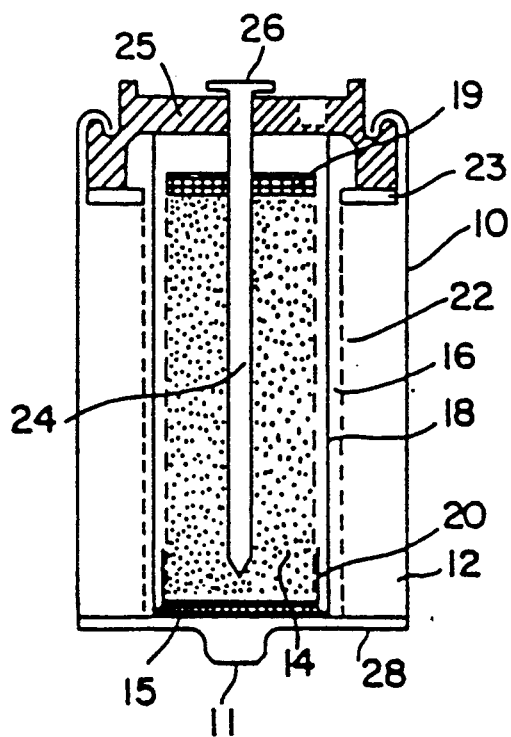
FIG. 1 is a vertical cross section of a typical cell in keeping with a first embodiment of the invention.
Figure 3:
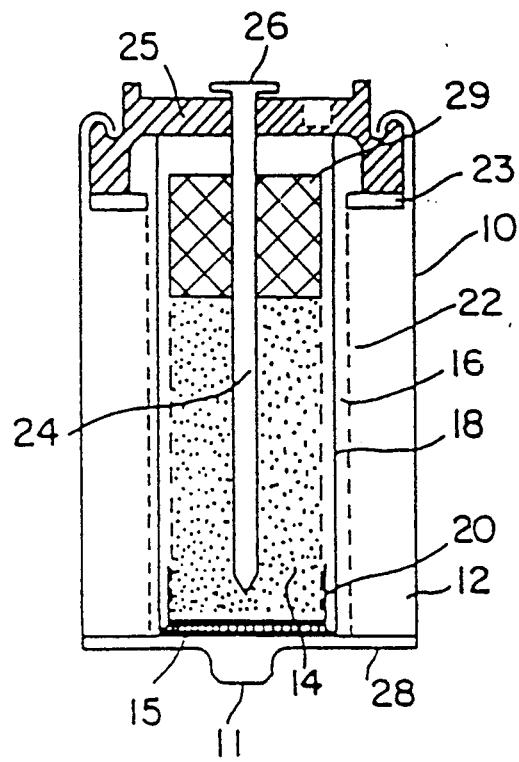
FIG. 3 is a vertical cross section of a typical cell in keeping with a second embodiment of the invention.

In FIGS. 1 and 3, like numerals are used to identify identical components of the typical cells being illustrated in those figures.

FIG. 1 of the drawings shows a typical embodiment of a cell according to the present invention. The cell comprises a steel can 10 housing a conventional metal oxide cathode 12. The base of can 10 has a boss 11 forming the cathode contact, formed cylindrically around anode 14. The cathode 12 may comprise finely divided manganese dioxide and graphite, and is separated from anode 14 which may comprise zinc powder, by an electrolyte permeable separator 16. The electrolyte, which may be aqueous potassium hydroxide, permeates the zinc powder of anode 14, and cathode 12, through separator 16. The cathode 12 may also be provided with auxiliary cathode material to catalyse the reabsorbtion of hydrogen as described in copending application No. 375,888 filed July 6, 1988, now U.S. Pat. No. 4,925,747 in the names of KORDESCH and TOMANTSCHGER.

As shown, the anode is confined by a basket 18, made for example, of Chicope-Rayon/polyvinyl acetate. The basket 18 also carries an auxiliary, electrochemical, transfer electrode 19 comprising a disk of porous carbon bonded with PTFE. The auxiliary electrode 19 is wetted by the electrolyte. The basket 18 is provided with an end cap 20, for example of brass, insulated from the base of can 10 by insulating disc 15. The cathode 12 is confined into cylindrical shape by screen 22 and annular plastic cap 23.

A current collector nail 24 projects into the anode 14 through a casing cover 25, with its head 26 being outside of the cover 25 to form the anode contact. The cover 25 seals the can 10 by crimping formed around its edge.

In the embodiment of FIG. 3, the cell is shown having the same general structure of FIG. 1, but in place of the auxiliary electrode 19, there is shown a transfer anode material 29 which is placed above the anode 14, and which is pierced by the current collector 24. The transfer anode material 29 is described in greater detail hereafter.

Figure 4:
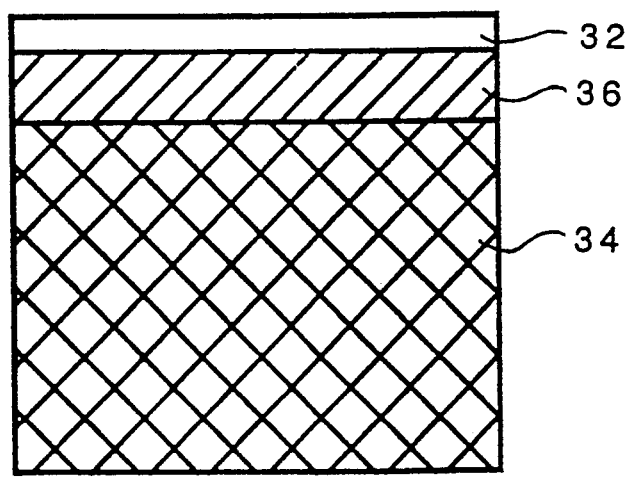
FIG. 4 is a schematic generalization of a rectangular electrode in keeping with the present invention.

FIG. 4 is intended to show a plate electrode comprising a current collector 32 having intimately associated with it an anode material 34 and a transfer anode material 36—which may be a strip of transfer anode gel as described hereafter—that has been co-extruded with the regular anode material onto the current collector 32.

EXAMPLE I

A conventional gelled or immobilized zinc anode as used in primary alkaline or rechargeable alkaline MnO2-Zn cells was formed, extruded into a separator basket (Chicopee Rayon/PVA), and placed in the center of a C cell can employing a polyethylene spacer, as shown in FIG. 1. Suitable Anode Compositions are:

| (A) | 61.4% 3% or 6% Hg New Jersey~ 1205 Zn |
| --- | --- |
|  | 2.0% ZnO |
|  | 1.0% MgO |
|  | 0.8% 70/30 CMC/940 (or Carbopol~) |
|  | 34.8% 9 N KOH with 8% ZnO |
|  | Total weight: 8.7 g |
| (B) | 50.0% amalgamated Zn |
|  | 20.0% Ca(OH)2 |
|  | 30.0% 9 N KOH with 8% ZnO |
|  | Total weight: 8.7 g |

An oxygen reduction electrode was prepared by forming a 400 micron layer comprising a mixture of carbon available commercially as "SHAWINIGAN BLACK"-and PTFE. A separator sheet (Dexter-C1235) was pressed in one side and a Ni screen into the other side of the carbon/PTFE layer, comprising 62.5% carbon and 37.5% PTFE. A disc with a diameter of 11 mm was punched out of the foil and the carbon disc placed on the top of an anode (which was formed, for example, from either of the above compositions) with the separator side facing the zinc. Thereafter, the brass nail current collector was driven through the carbon disc into the gelled anode.

The function of the separator disc is to soak up electrolyte assisting in partial wetting of the carbon disc by the electrolyte. The brass nail penetrates both electrodes assuring electronic contact of the two electrodes, and thereby establishing a "zinc-oxygen short circuit element".

To demonstrate the capability of the present invention in terms of oxygen recombination, two half cells of the C-cell size were fabricated, one with and one without the carbon disc. Both open cells were placed vertically in a tube, the cathode void was filled with 9 N KOH to the height of the polyethylene spacer and the cells were galvanostatically discharged at 50 mA for 20 hours removing 1 Ah of the negative electrodes (total capacity approx. 4 Ah). Cell tops used to close the elements contained tube fittings attached to U tubes filled with water by means of flexible tubing. After crimping, the cells were gas tight and any pressure change was indicated by the manometers.

Figure 2:
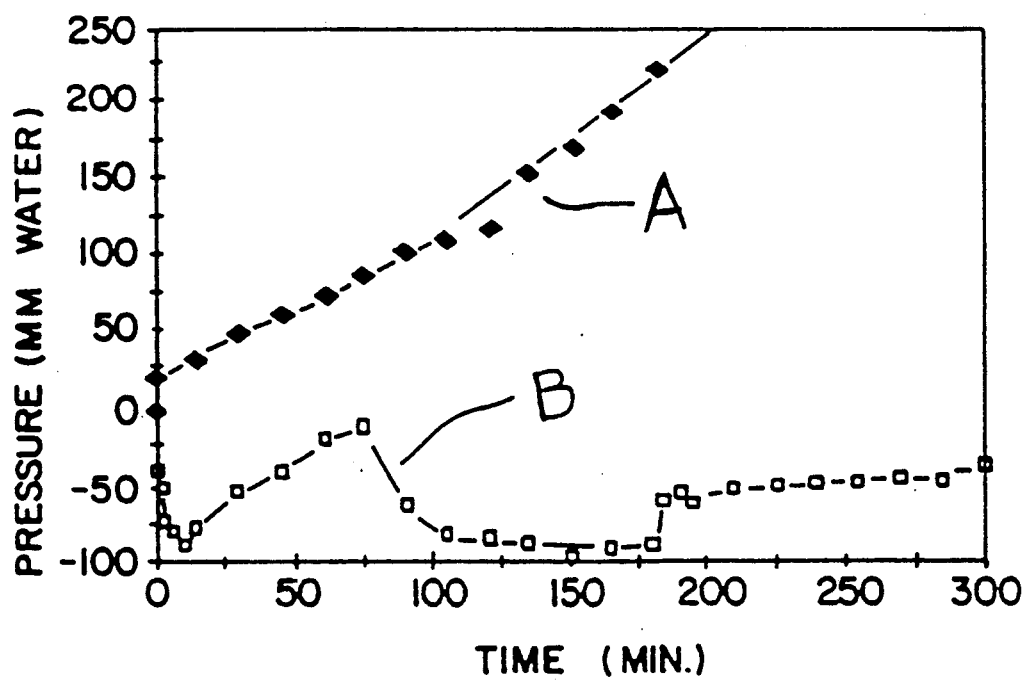
FIG. 2 is a graph comparing the operating characteristics of prior art and an inventive cell, as described in Example I.

Both cells were galvanostatically charged with 50 mA for three hours at room temperature. The negative electrode reaction consisted of reduction of ZnO to metallic Zn. The counter reaction involved generation of oxygen on the surface of the can at a rate of 10 ml oxygen per hour (at 50 mA). FIG. 2 shows the resulting pressure curves.

Curve A represents pressure increase with time for the conventional cell without the carbon electrode. Curve B illustrates similar data for the cell containing the catalytically active disc. This cell developed a significant under pressure after cell closure, which is due to the reduction of the air oxygen present in the gas space of the cell. During the three hours of overcharge at 50 mA, the 1 square cm disc recombined 30 ml NPT of oxygen gas by maintaining lower than atmospheric pressure. An increase in the overcharge current to 100 mA (20 ml oxygen per hour) caused the pressure to stablize at a somewhat higher value; however, still below atmospheric pressure. No significant pressure change was observed over a period of two hours, indicating the recombination of additional 40 ml oxygen gas evolved during change. The maximum gas recombination rate was determined to be 25 ml oxygen per hour per cm$^2$ electrode area—equivalent to an oxygen evolution current of 120 mA which, for the cell size used, is significantly more than required under "realistic user conditions".

The present invention may provide economic and effective means of removing oxygen gas in galvanic cells. In alkaline electrolytes, carbon materials generally comprise sufficient catalytic activity for oxygen reduction. Similar electrodes, using noble or non noble metal oxide catalysts, are described in co-pending application No. 405,185 filed Sept. 11, 1989, now abandoned. "Metal and Metal Oxide Catalyzed Electrodes for Electrochemical Cells, and Methods of Making Same" by K. Kordesch and K. Tomantschger. They may be employed if higher recombination current densities are desirable.

To determine the long term electrode performance a half cell containing a catalytically active disc as described was operated continuously at 20 mA/cm$^2$ for 365 hours, and thereafter the current density was increased to 50 mA/cm$^2$. The test was discontinued after consumption of in excess of 3.5 litres NPT oxygen. The following table demonstrates the performance obtained in 6 N KQH electrolyte at room temperature, for air as reaction gas (use of oxygen led to an increase in potential by 40–50 mv):

| Time [hrs.] | Oxygen Consumption [ml] | Current [mA/cm2] | IR Free Potential [mV vs Hz] |
|---|---|---|---|
| 0 | 0 | 20 | 626 |
| 24 | 100 | 20 | 691 |
| 48 | 199 | 20 | 683 |
| 96 | 398 | 20 | 679 |
| 145 | 602 | 20 | 674 |
| 194 | 805 | 20 | 690 |
| 290 | 1203 | 20 | 668 |
| 338 | 1406 | 20 | 663 |
| 365 | 1519 | 50 | 717 |
| 365 | 1519 | 50 | 664 |
| 389 | 1768 | 50 | 663 |
| 413 | 2015 | 50 | 628 |
| 461 | 2515 | 50 | 630 |
| 509 | 3012 | 50 | 600 |
| 565 | 3593 | 50 | 566 |

[The IR free potential is determined using laboratory procedures and standards, and is measured in millivolts as against the Reversible hydrogen Electrode Reference].

Turning now to FIGS. 3 and 4, the following discussion is particularly directed to the use of the transfer anode material 29 which may take the place of the disc 19. The transfer anode material, as with the disc 19 described above, must be in electronic and ionic contact with the anodic material of the cell, and it is porous and is at least partially wetted by the electrolyte. By being partially wetted by the electrolyte, ionic contact between the transfer anode material and the anodic material or the anode of the cell is established. Moreover, since the transfer anode material is in intimate physical association with the current collector, which in turn is in intimate physical association with the anode 14, electronic contact is established between the transfer anode material and the anode.

Generally, in keeping with this embodiment of the invention, the transfer anode material is comprised of a gel similar to or substantially identical to the gel which is used as the zinc anode, together with an addition of oxygen recombination catalytically active material. That material may be particles of graphite admixed with the zinc, or it may be metal-plated zinc particles admixed with the zinc; where the metal which plates the metal-plated zinc particles is generally copper but may also be chosen from the group consisting of cadmium, cobalt, nickel, and silver.

Particularly in cylindrical cells that are small size such as "AA" or smaller, difficulties have been observed in placing a disc such as the disc 19 discussed above.

In smaller cell sizes, the diameter of the disc is considerably reduced, so much so that difficulties are encountered especially in high speed automated production of cells. Particularly with small cells, it has been observed that the disc is sometimes pushed down into the anode or at least is partially immersed by the anode, thereby reducing its effectiveness. It is also to be mentioned that the use of the disc requires that there be provided additional equipment on the assembly line, and an additional station, as well as additional equipment for the fabrication of the discs off-line. Especially with smaller cells, if the disc is first placed over the anode and then the current collector—the nail—is driven through it, as mentioned above there is the possibility of the disc being immersed or partially immersed in the anode. On the other hand, if the disc is placed on the nail together with the cover 25, additional off-line assembly must take place before the rail/disc/cover combination reaches the station where it is placed into the cell.

By providing a transfer anode material which is essentially a gelled material, an additional station may be placed on the line where the cells are assembled, and that station may be essentially identical to the gel dispersion station in the case of cylindrical cells, where the anode is extruded into the cell, so that the same equipment may be used. In the case of rectangular anodes for flat plate or jelly roll cells, the catalytically active anode strip may be co-extruded with the regular anode material, so that once again the same or similar equipment may be used.

Generally, graphite particles (or other catalytically active particles such as Cu, Cd, Ni, or Ag—usually in powder form) in an amount of from about 0.1% to about 6% by weight of the zinc in the cell may be admixed with the gelled zinc anode, or metal-plated zinc particles (where the metal is copper, but may be cadmium, cobalt, nickel, or silver) may be admixed in the amount of from about 0.1% to about 6% by weight of the metal with respect to the amount of zinc in the cell; or both graphite particles and metal-plated zinc particles, each in the same general range as described above, may be used.

It has been found particularly effective to use electroless plated copper on zinc particles, where the amount of copper used in the transfer anode material is in the range of from about 1% to about 4% by weight of zinc in the cell, usually about 2%.

Even though the gel is hydrophilic, the transfer anode material is generally porous, so that oxygen gas present within the cell may enter into the porous structure under the effect of oxygen gas pressure Within the cell. That means that oxygen gas may be combined with the anode material of the cell, independent of the cell size.

Indeed, the transfer anode material may be used generally in the amount of from about 10% to about 30% by volume of the total anode in the cell, but it may be present in the amount of from as little as 5% to as much as 100% of the total anode material in the cell. At the latter range, it is evident that the transfer anode material takes the place of the anode, so that the oxygen recombination catalyst is present throughout the anode.

As noted above, in the case where a plate electrode is to be produced, a strip of the transfer anode material may be extruded onto the current collector, on which the anode material is also placed so that each is in infinite physical contact with the current collector, each is at least partially wetted by the electrolyte, and therefore each of the transfer anode material and the anode are in electronic and ionic contact with each other.

EXAMPLE II

In this Example, a conventional gelled zinc anode formulation is formed, much as in Example I. However, it has added to it copper plated zinc, and is placed in the cell in the amount of 100%. Thus the entire anode is taken up by a transfer anode material which is essentially a gelled zinc anode having with it copper plated zinc particles. In this case, the copper is present in the amount of about 2% by weight of the zinc in the cell. In another test batch of cells, the anode was taken up by a transfer anode material having graphite particles admixed in the amount of about 3% by weight of zinc in the cell. The remaining controls are a standard cell having no transfer or auxiliary electrode, and a cell having a carbon disc such as that described above with respect to Example I. In each case, all of the cells were "AA" size.

Table II shows the oxygen recombination in ml. measured each five minutes for one hour for the four different types of cells described above for this test. It will be noted that the standard cell having no oxygen recombination catalyst had a total recombination of 3.8 ml. of oxygen in one hour., and a cell which was otherwise a standard cell but had a carbon disc of the sort described above with respect to Example I had a recombination of 12.0 ml. of oxygen in one hour.

On the other hand, cells having graphite particles with zinc, as noted above, had an oxygen recombination of 90.0 ml. in one hour, and cells having copper plated zinc particles as noted above had an oxygen recombination of 122.4 ml. in one hour.

TABLE II

| | | Oxygen Recombination (ml.) "AA" Cells | | | |
|---|---|---|---|---|---|
| Reading No. | Time (Min) | Cu/Zn Gel | Zn & C Gel | Zn/Hg Gel | Carbon Disc |
| 1 | 0 | 0.0 | 0.0 | 0.0 | 0.0 |
| 2 | 5 | 19.0 | 12.0 | 1.6 | 4.0 |
| 3 | 10 | 45.0 | 16.0 | 2.0 | 6.0 |
| 4 | 15 | 86.5 | 23.6 | 2.0 | 7.0 |
| 5 | 20 | 95.4 | 30.4 | | |
| 6 | 25 | 101.4 | 37.4 | | |
| 7 | 30 | 105.2 | 45.0 | | 8.8 |
| 8 | 35 | 108.8 | | | |
| 9 | 40 | 111.6 | 60.8 | | |
| 10 | 45 | 115.0 | 75.4 | | 10.4 |
| 11 | 50 | 118.4 | 80.0 | | |
| 12 | 55 | 120.4 | 85.0 | | |
| 13 | 60 | 122.4 | 90.0 | 3.8 | 12.0 |

EXAMPLE III

In this Example, seven different anodes or anode combinations were prepared and placed in cells which, in all cases, were "D" size. The starting zinc anode formulation as in Example I was used, with a variety of different transfer anode materials or auxiliary electrodes, except in the control cells which were standard cells, as noted below. The results are shown in Table III.

| | |
|---|---|
| Control Cell | These cells were standard cells in all respects. |
| 2% Cu/Zn | In these cells, 100% of the anode was taken up by transfer anode material having copper plated zinc particles, where the copper is present in the amount of about 2% by weight of the zinc. |
| 3% C | In these cells, 100% of the anode was taken up by transfer anode material having graphite particles admixed in the amount of about 3% by weight of the zinc. |
| 0.2 Cu/Zn | In these cells, 80% of the anode was the conventional formulation; 20% was taken up by a transfer anode material having copper plated zinc particles in the amount to represent 0.2% by weight of zinc in the cell. |
| PTFE/C | In these cell, a conventional gelled zinc anode formulation was used together with an auxiliary electrode which was a disc of a single layer of PTFE impregnated with carbon. |
| Carbon Felt | These cells had a conventional zinc anode with an auxiliary electrode being a carbon felt disc impregnated with a carboDag binder. |
| Felt/PTFE | These cells had conventional gelled zinc anodes with an auxiliary electrode being a carbon felt disc impregnated with PTFE. |

In each case, the cells were pressurized with oxygen gas up to 100 psi. Then, over the period of one hour, the oxygen consumption was recorded. See Table III.

TABLE III

| | Oxygen Recombination (ml.) "D" Cells | | | | | | |
|---|---|---|---|---|---|---|---|
| Reading | Control | 2% Cu/Zn | C-flex | 0.2 Cu/Zn | CMD | C-Felt | Felt/PTFE |
| 1 | 0.0 | 0.0 | 0.0 | 0.0 | 0.0 | 0.0 | 0.0 |
| 2 | 3.3 | 42.9 | 23.1 | 23.1 | 9.3 | 5.7 | 8.1 |
| 3 | | 66.0 | 29.1 | 36.0 | 14.0 | | 9.9 |
| 4 | 4.8 | 81.9 | 37.2 | 48.9 | 18.6 | 12.6 | 11.4 |
| 5 | | 96.6 | 45.6 | 60.0 | 22.2 | 14.7 | 13.2 |
| 6 | | 106.5 | 53.7 | 70.5 | 24.5 | 19.8 | 15.3 |
| 7 | | | 61.2 | 79.5 | 27.3 | 21.0 | 16.8 |
| 8 | 6.9 | 121.4 | 69.0 | 87.9 | 29.7 | 24.0 | 18.6 |
| 9 | | 129.9 | 75.9 | 96.6 | 32.7 | 26.0 | 20.7 |
| 10 | 7.8 | 136.5 | 82.8 | 102.9 | 38.1 | 29.7 | 22.2 |
| 11 | | 141.0 | 90.0 | 108.9 | 39.8 | 32.1 | 24.3 |
| 12 | | 147.5 | 97.2 | 116.4 | 44.1 | 34.8 | 25.8 |
| 13 | 8.7 | 152.1 | 104.4 | 122.2 | 46.5 | 37.8 | 29.1 |

It should also be recognized that the present invention is applicable to other rechargeable cells having metal hydride anodes, as well as zinc anodes as discussed above.

Various means are shown to accelerate and promote oxygen scavenging or recombination of oxygen evolved within a cell, in the anode of the cell. The scope of the present invention is defined by the appended claims.

What we claim is:

1. A rechargeable electrochemical cell having a metal oxide cathode, metal anodic material, a current collector in intimate physical association with said anodic material, a separator between the anodic material and the cathode, and an aqueous alkaline electrolyte contacting said anodic material, said separator, and said cathode., in which cell oxygen may evolve on charge, overcharge, or any reversal of cell polarity;

said cell including transfer anode material in electronic and ionic contact with said anodic material, said transfer anode material being porous and at least partially wetted by said electrolyte so as to thereby establish said ionic contact with said anodic material;

said transfer anode material having a catalytic material which acts to promote accelerated consumption of any oxygen gas present within said cell by the anodic material of said cell;

said transfer anode material and said current collector being in intimate physical association so as to thereby establish said electronic contact between said transfer anode material and said anodic material;

whereby oxygen evolved within said cell is recombined by said transfer anode material.

2. The rechargeable electrochemical cell of claim 1, where said anodic material is chosen from the group consisting of metal hydrides and zinc.

3. The rechargeable electrochemical cell of claim 2, where said anodic material is zinc.

4. The rechargeable electrochemical cell of claim 3, where said current collector is a rectangular plate, and said anodic material and said transfer anode material are in intimate physical contact therewith and are PTFE bonded thereto.

5. The rechargeable electrochemical cell of claim 4, where said catalytic material is chosen from the group consisting of graphite particles, Cu particles, Cu powder, Ni particles, Ni powder, Ag particles, Ag powder, Cd particles, Cd powder, and metal-plated zinc particles where said metal is chosen from the group consisting of Cu, Ag and Cd.

6. The rechargeable electrochemical cell of claim 1, where said catalytic material is a gelled zinc anode material having admixed thereto graphite particles or metal-plated zinc particles.

7. The rechargeable electrochemical cell of claim 3, where said catalytically active material is chosen from the group consisting of graphite particles, Cu particles, Cu powder, Ni particles, Ni powder, Ag particles, Ag powder, Cd particles, Cd powder, and metal-plated zinc particles where said metal is chosen from the group consisting of Cu, Ag, and Cd, and is present in said transfer anode material in the amount of from about 0.1% to about 6.0% by weight of either of said graphite particles or the metal of said metal-plated zinc particles, or both, with respect to the amount of zinc present in said cell.

8. The rechargeable electrochemical cell of claim 7, where said metal which plates said zinc material is chosen from the group consisting of copper, cadmium, cobalt, nickel, and silver.

9. The rechargable electrochemical cell of claim 7, where said metal-plated zinc particles are copper plated.

10. The rechargeable electrochemical cell of claim 9, where said metal-plated zinc has copper in the amount of from about 1% to about 4% by weight of zinc in said cell.

11. The rechargeable electrochemical cell of claim 9, where said metal-plated zinc has copper in the amount of from about 1% to about 3% by weight of zinc in said cell.

12. The rechargeable electrochemical cell of claim 7, where said metal-plated zinc particles are electroless plated copper on zinc.

13. The rechargeable electrochemical cell of claim 7, where said transfer anode material is present in the amount of from about 5% to 100% by volume of total anode in said cell.

14. The rechargeable electrochemical cell of claim 7, where said transfer anode material is present in the amount of from about 10% to about 30% by volume of total anode in said cell.

15. A rechargeable electrochemical cell having a metal oxide cathode, a metal anode, a current collector in intimate physical association with said metal anode, a separator between the metal anode and the cathode, and an aqueous alkaline electrolyte contacting said metal anode, said separator, and said cathode; in which cell oxygen may evolve on charge, overcharge, or any reversal of cell polarity;

said cell including transfer anode material in electronic and ionic contact with said metal anode, said transfer anode material being porous and at least partially wetted by said electrolyte so as to thereby establish said ionic contact with said metal anode;

said transfer anode material having a catalytic material which acts to promote accelerated consumption of any oxygen gas present within said cell by the metal anode of said cell;

said transfer anode material and said current collector being in intimate physical association so as to thereby establish said electronic contact between said transfer anode material and said metal anode;

whereby oxygen evolved within said cell is recombined by said transfer anode material.

16. The rechargeable electrochemical cell of claim 15, where said anodic material is chosen from the group consisting of metal hydrides and zinc.

17. The rechargeable electrochemical cell of claim 16, where said anodic material is zinc.

18. The rechargeable electrochemical cell of claim 17, where said current collector is a rectangular plate, and said metal anode and said transfer anode material are in intimate physical contact therewith and are PTFE bonded thereto.

19. The rechargeable electrochemical cell of claim 18, where said catalytic material is chosen from the group consisting of graphite particles, Cu particles, Cu powder, Ni particles, Ni powder, Ag particles, Ag powder, Cd particles, Cd powder, and metal-plated zinc particles where said metal is chosen from the group consisting of Cu, Ag and Cd.

20. The rechargeable electrochemical cell of claim 19, where said graphite particles of metal-plated zinc particles are present in said transfer anode material in the amount of from about 0.1% to about 6.0% by weight of either of said graphite particles or the metal of said metal-plated zinc particles, or both, with respect to the amount of zinc present in said cell.

21. A rechargeable electrochemical cell of claim 15, where said catalytic material is a gelled zinc anode material having admixed thereto graphite particles or metal-plated zinc particles.

22. A rechargeable electrochemical cell of claim 15, where said catalytic material is a gelled zinc anode material having admixed thereto a catalytically active material chosen from the group consisting of graphite particles, Cu particles, Cu powder, and metal-plated zinc particles where said metal is chosen from the group consisting of Cu, Ag and Cd.

23. A rechargeable electrochemical cell having a cylindrical metal oxide cathode, a gelled zinc anode, a current collector extending into said gelled zinc anode, a separator between said zinc anode and said metal oxide cathode, and an aqueous alkaline electrolyte contacting said zinc anode, said separator, and said cathode; in which cell oxygen may evolve on charge, overcharge, or any reversal of cell polarity;

- said cell including a transfer anode material in electronic and ionic contact with said zinc anode, said transfer anode material being porous and at least partially wetted by said electrolyte so as to thereby establish said ionic contact with said zinc anode;
- said transfer anode material comprising a gelled zinc anode material having admixed thereto graphite particles or metal-plated zinc particles as catalytic material which acts to promote accelerated consumption of any oxygen gas present within said cell by said zinc oxide and/or by said transfer anode material;
- said current collector extending into said transfer anode material so as to establish said electronic contact between said transfer anode material and said zinc anode;
- whereby oxygen evolved within said cell is recombined by said transfer anode material.

* * * * *